May 17, 1949.  W. B. BIEBESHEIMER  2,470,598
TRANSFORMER WINDINGS
Filed Jan. 29, 1948
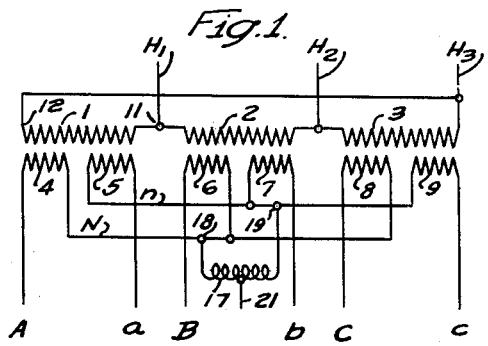
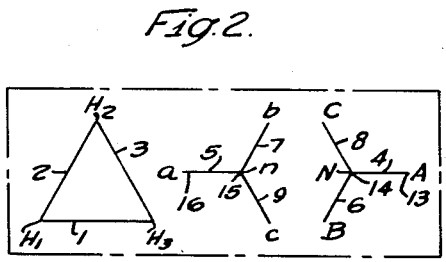
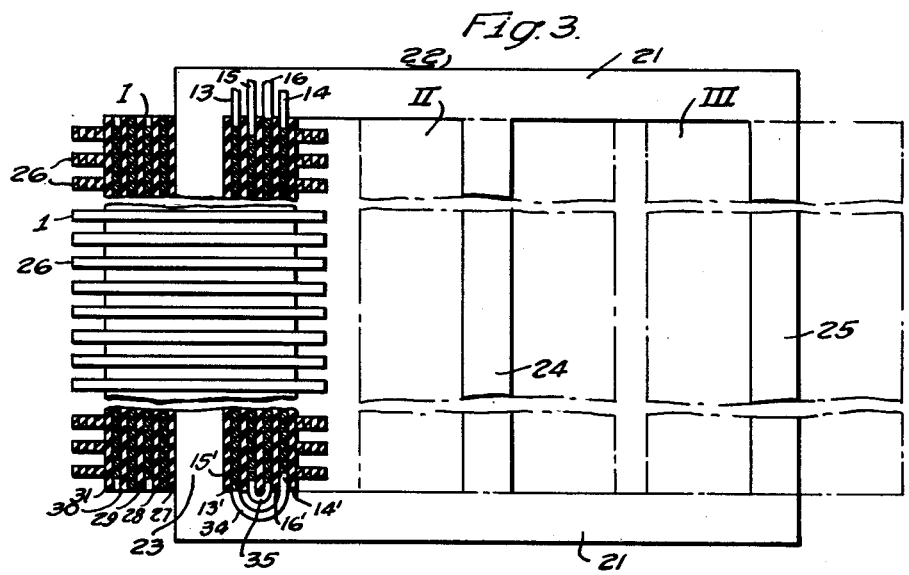
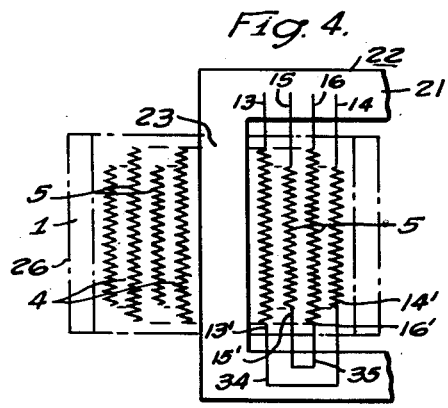
WITNESSES:
INVENTOR
William B. Biebesheimer.
BY
Franklin E. Hardy
ATTORNEY Patented May 17, 1949

2,470,598

UNITED STATES PATENT OFFICE 2,470,598

TRANSFORMER WINDINGS

William B. Biebesheimer, Toledo, Ohio, assignor to Westinghouse Electric Corporation, East Pittsburgh, Pa., a corporation of Pennsylvania Application January 29, 1948, Serial No. 5,073

9 Claims. (Cl. 175—361)

1

My invention relates to electrical apparatus such as multi-phase transformers employing a plurality of cylindrical coils on each winding leg of the transformer core.

In accordance with the invention, a multi-phase transformer is provided having concentric primary and secondary windings on each winding leg of the core, the circuit conductor strands comprising the two halves of each phase winding being so wound that close coupling exists between the primary winding and each half of the secondary winding.

In order that the two three-phase groups of secondary windings formed from the two halves of each phase winding will carry equal currents, it is necessary that the impedance between the high-voltage winding and each of the two low-voltage half-windings be alike. Where a plurality of cylindrical windings having different radii are positioned as a nested group of winding layers concentrically about the axis of the winding leg of a transformer core, this result will not ordinarily obtain.

If an even number of cylindrical coil layers are positioned about a winding leg of the core structure, and the number of turns of the coil layers are so varied that there are more turns in the first layer than in the second layer, and the odd-numbered layers in the series have the same number of turns as each other and the even-numbered layers likewise have the same number of turns as each other, and the layers are so connected in forming the separate windings that the innermost layer and the outermost layer are connected together in series circuit relation to form a winding, while the next innermost layer and the next outermost layer of the nested group of layers are connected in series circuit relation to form another winding, and this practice is continued throughout however many pairs of layers there may be in the nested group, the reactances of the several windings can be made practically identical. Likewise, each three-phase group formed by connecting corresponding windings from each of the several phase-winding groups together to form Y-connected secondary windings will result in similar three-phase reactance so that the several three-phase windings will carry equal currents.

It is an object of the invention to provide a three-phase transformer comprising a core having three winding legs and a plurality of phase windings one each core leg for connection to provide a plurality of three-phase winding groups in

2 which the coils of the several groups will carry substantially the same current.

It is a more specific object of the invention to provide a transformer of the above-indicated character in which the reactance from the primary winding to each of the individual secondary windings are equal. This may be done by providing a plurality of a like number of cylindrical coil layers about each winding leg of the transformer core and arranging the number of turns of the several layers that they are so unbalanced and the layers so connected as to provide a plurality of three-phase groups of windings that will carry substantially equal three-phase currents.

Other objects and advantages of the invention will be apparent from the following description of a preferred embodiment thereof, reference being had to the accompanying drawing, in which:

Figure 1 is a diagrammatic view of connections of the primary and secondary windings of a three-phase transformer in which the windings may be arranged in accordance with my invention;

Fig. 2 is a polarity (or vector) diagram of the connections of the windings shown in Fig. 1;

Fig. 3 is a view showing a three-phase core structure with the phase windings on the second and third winding legs indicated in outline and portions of the windings on the first winding leg of the core being shown in section and arranged in accordance with my invention, and Fig. 4 is a diagrammatic illustration of the windings shown in Fig. 3 showing the arrangement of the conductors comprising the two halves of the windings.

Referring to the drawing and particularly to Figures 1 and 2 thereof, $H_1$, $H_2$ and $H_3$ represent three-phase conductors of a primary circuit supplying the three-phase primary windings 1, 2 and 3 which are shown connected in delta relation. The three primary windings will be mounted so as to encircle three different winding legs of the three-phase transformer core in a well-known manner, there being associated with each primary winding a plurality of secondary windings shown in the illustrated embodiment of the invention as two secondary half-windings each comprising two coil layers. As illustrated, the secondary windings 4 and 5 are associated with the primary winding 1 and are coupled with the primary winding 1 and positioned about the same winding leg of the core, the secondary windings 6 and 7 are associated with the primary winding 2 and are positioned about the same winding leg of the core as the primary winding 2 and coupled to the primary winding 2, while the secondary windings 8 and 9 are associated with the primary winding 3 and wound about the same winding leg of the core as the primary winding 3. As indicated in Figs. 1 and 2, the seconadry windings of the transformer provide a six-phase circuit consisting of two three-phase Y-connected portions.

One of these portions comprises windings 4, 6 and 8 connected between a common neutral point N and three-phase conductors A, B and C, respectively. The remaining three secondary windings 5, 7 and 9 are connected between a common neutral point $n$ and three secondary conductors $a$, $b$ and $c$, respectively. As is clearly indicated in Fig. 2, the two secondary windings associated with each phase primary winding are connected in voltage opposition, so that the instantaneous voltages with respect to the neutral point of the winding will be 180 electrical degrees out of phase. Specifically, the winding 4 that is connected between the neutral point N and the phase conductor A and the winding 5 that is connected between the neutral point $n$ and the phase conductor $a$ are in voltage opposition, and this is indicated in Fig. 2 by the fact that the vectors corresponding to the voltages in the windings 4 and 5 are parallel but extend in opposite directions from the neutral point of their respective Y-connected portions. This is true also of the secondary windings 6 and 7 that are coupled to the primary winding 2 and also of the secondary windings 8 and 9 that are coupled to the primary winding 3 so that the two Y-connected groups of three-phase windings provide inverted polarity patterns as shown in Fig. 2.

Referring to Fig. 3, the core structure 22 of magnetic material is illustrated having three vertical winding legs 23, 24 and 25 connected by yoke portions 21 at the top and bottom thereof. Phase windings I, II and III are provided about the three winding leg portions 23, 24 and 25, respectively. The phase winding I includes the primary winding 1 and the secondary windings 4 and 5 positioned about the winding leg 23. The phase windings II include the primary winding 2 and the secondary windings 6 and 7 positioned about the middle winding leg 24, and the phase windings III include the primary winding 3 and the secondary windings 8 and 9 that are positioned about the third winding leg 25. Since each set of windings I, II and III is similar, only one set is shown in detail, that being the set on the first core leg 23 in Fig. 3.

The primary winding 1 is illustrated in Fig. 3 as comprising a series of disc-type coils 26 surrounding the secondary windings comprising four layers of coils, each coil layer consisting of a conductor wound in cylindrical form, the several convolutions of the coil layer following a helix path in which the diameter of each turn in the layer corresponds to that of the other turns of the layer. A series of insulating tubular barriers 27, 28, 29, 30 and 31 are placed to insulate the coil layers from the winding leg 23, from each other, and from the primary winding 1.

As shown structurally in Fig. 3 and diagrammatically in Fig. 4, the secondary windings in the illustrated embodiment of the invention comprise four cylindrical coil layers. The innermost layer 13, 13' nearest to the winding leg 23 is shown as having a greater number of turns than the next innermost layer 15, 15', and the third layer 16, 16' is shown as having the same number of turns as the first layer 13, 13', while the fourth layer 14, 14' is shown as having the same number of turns as the second layer 15, 15'. That is to say, the innermost layer and all succeeding odd-numbered layers, first, third, fifth, etc., have a greater number of turns than the even-numbered layers, second, fourth, sixth, etc. Also, the innermost layer is connected to the outermost layer by a conductor shown at 34 in Figs. 3 and 4, and the next innermost layer is connected to the next outermost layer by a conductor shown at 35 in Figs. 3 and 4 so that each secondary winding circuit path includes two coil layers, the one having a greater number of turns than the other, the alternate layers beginning with the first being longer (that is, having more turns) and the intermediate alternating layers being shorter (that is, having less turns), and each secondary winding circuit including two layers having a different number of winding turns. If the turns per layer are unbalanced in the manner above-described so that there are more turns in one layer and less turns in the other layer of the two series-connected layers forming one of the secondary winding circuits associated with one winding leg, the reactances between the several secondary winding circuits can be made practically identical. As a result, when corresponding secondary windings of the three-phase groups are connected together in the manner shown in Figs. 1 and 2, each three-phase group will carry equal currents. If coil layers having the same number of turns are used, a considerable difference in the reactance between the high-voltage winding and the several low-voltage windings may result because of the space difference from the high-voltage winding to the low-voltage windings.

In the above-described arrangement of the circuits, the primary is shown as delta-connected and the secondary as a double Y circuit. It will be appreciated that this connection of the windings is used in an illustrative sense and that the above-described arrangement of the several cylindrical coil layers arranged and connected as above described is applicable to other rectifier circuits in common use. It will be appreciated that the phase windings II and III about the winding legs 24 and 25 correspond to the phase windings I about the winding leg 23.

When used as a rectifier supply transformer, the number of turns in windings A—N and $a$—$n$, B—N and $b$—$n$, C—N, $c$—$n$, etc., will always be the same, thus requiring the sum of the turns in the innermost and outermost layers of winding turns to equal the sum of the turns in the next innermost and next outermost layers of turns. Also, the kilovolt-ampere rating of the group $a$—$b$—$c$ will be the same as the group A—B—C.

To achieve equal reactances from the primary winding to each of the individual secondary windings, it is not necessary that the innermost layer of winding turns and the next outermost layer of winding turns of the group have the same number of turns, and that the outermost and next innermost layers of winding turns of the group have the same number of winding turns, although this may be the case in a particular arrangement of the winding turns to accomplish the desired result. In some instances, however, it may be convenient to wind the next innermost and the next outermost layers of winding turns with an equal number of turns, while the innermost layer is wound with a greater number of turns and the outermost layer is wound with a fewer number of turns than this, or it may be convenient to wind the innermost and the outermost layers of turns with an equal number of turns while the next outermost layer has more turns and the next innermost layer has fewer turns than the innermost and the outermost layers.

The important consideration is that the several layers of secondary winding coils shall have the number of winding turns unbalanced in such manner and so connected that the reactances between the primary winding and the separate secondary windings are equal.

It will be obvious to one skilled in the art that other modifications of the structure illustrated and described may be made within the spirit of my invention, and I do not wish to be limited otherwise than by the scope of the appended claims.

I claim as my invention:

1. In an alternating-current electrical apparatus comprising concentrically arranged inductively related windings including a primary winding and a plurality of secondary windings, the secondary windings comprising a group of an even number of concentrically related single layer cylindrical coils of electrical conductors, the number of winding turns in adjacent coil layers varying so that the even-numbered layers of the series have a like number of turns and the odd-numbered layers of the group have a like number of turns different from that of the even-numbered layers, the separate secondary windings including two coil layers of a different number of turns in series circuit relation so arranged that the innermost and outermost coil layers of the group are connected in series circuit relation to form a winding, and the next innermost and the next outermost coil layers are connected in series circuit relation to form a winding, to provide a plurality of secondary windings having substantially the same reactance.

2. In an alternating-current electrical apparatus comprising concentrically arranged inductively related windings including a primary winding and a plurality of secondary windings, the secondary windings comprising a group of an even number of concentrically related single layer cylindrical coils of electrical conductor, the successive turns in each coil following a cylindrical helix path having the same diameter as the other turns in that coil, the innermost coil of the series of cylindrical coils having more coil turns than the second coil in the series and each odd-numbered coil having the same number of turns as the innermost coil and each even-numbered coil having the same number of turns as the second coil in the series so that the number of turns in successive coils alternate between more turns and less turns, the separate secondary windings including two coils of a different number of turns in series circuit relation so arranged that the innermost and outermost coils of the group are connected in series circuit relation to form a winding, and the next innermost and the next outermost coil are connected in series circuit relation to form a winding, to provide a plurality of secondary windings having substantially the same reactance.

3. In an alternating-current electrical apparatus comprising concentrically arranged inductively related windings including a primary winding and a pair of secondary windings, the secondary windings comprising a nested group of an even number of concentrically related single layer coils of electrical conductors, the successive turns in each coil layer having the same diameter as the other turns in that coil layer and following a cylindrical helix path, the number of winding turns in adjacent coil layers varying so that the odd-numbered layers of the group have a like number of turns and the even-numbered layers of the group have a like number of turns different from that of the odd-numbered layers, one of the secondary windings of said pair including the innermost and the outermost coil layers of the nested group of single layer coils and the other one of the secondary windings of said pair including the next innermost and the next outermost coil layers of the nested group of layers.

4. In an alternating-current electrical apparatus comprising concentrically arranged inductively related windings including a primary winding and a pair of secondary windings, the secondary windings comprising a nested group of four concentrically related single layer coils of electrical conductors, the successive turns in each coil layer having the same diameter as the other turns in that coil layer and following a cylindrical helix path, the number of winding turns in adjacent coil layers varying so that the first and third layers of the group have a like number of turns and the second and fourth layers of the group of four layers have a like number of turns less than the number of turns in the first and third layers, one of the secondary windings of said pair including the first and fourth coil layers of the nested group of single layer coils connected in series circuit relation and the other one of the secondary windings of said pair including the second and third coil layers of the nested group of layers connected in series circuit relation to provide a pair of secondary windings having substantially the same reactance.

5. In a three-phase alternating-current electrical apparatus, a three-phase core structure having three winding legs, a set of phase windings wound about each of the three winding legs, each set of phase windings comprising concentrically arranged inductively related primary and secondary windings, the secondary windings comprising a nested group of an even number of concentrically related single layer coils of electrical conductors connected in two circuit conductor paths, the successive turns in each coil layer having the same diameter as the other turns in that coil layer and following a cylindrical helix path, the number of winding turns in adjacent coil layers varying so that the odd-numbered layers of the group have a like number of turns and the even-numbered layers of the group have a like number of turns different from that of the odd-numbered layers, one of the secondary windings of said two circuit conductor paths including the innermost and the outermost coil layers of the nested group of single layer coils and the other one of the secondary windings including the next innermost and the next outermost coil layers of the nested group of layers, the opposite ends of the two circuit conductor paths being connected to different neutral points so that the remaining opposite ends develop voltages in opposite polarity with respect to the neutral points of the circuit conductor paths, the several circuit conductor paths of the secondary windings of the several phases having a neutral point at one end of the series of secondary coil layers being connected together in Y relation, and the remaining circuit conductor paths of the several phases having a neutral point at the other end of the series of secondary coils also being connected together in Y relation, the two groups of circuit conductor paths comprising the secondary windings having inverted polarity patterns.

6. In a three-phase alternating-current electrical apparatus, a three-phase core structure having three winding legs, a set of phase windings wound about each of the three winding legs, each set of phase windings comprising concentrically arranged inductively related primary and secondary windings, the secondary windings comprising a nested group of four concentrically related single layer coils of electrical conductors connected in two circuit conductor paths, the successive turns in each coil layer having the same diameter as the other turns in that coil layer and following a cylindrical helix path, the number of winding turns in adjacent coil layers varying so that the first and third layers of the group have a like number of turns and the second and fourth layers of the group have a like number of turns less than the number of turns in the first and third layers, one of the secondary windings of said two circuit conductor paths including the first and fourth coil layers of the nested group of single layer coils connected in series circuit relation and the other one of the secondary windings including the second and third coil layers connected in series circuit relation, the two circuit conductor paths of the secondary windings of the several phases having a neutral point at one end of the series of secondary coil layers being connected together in Y relation, and the remaining circuit conductor paths of the several phases having a neutral point at the other end of the series of secondary coil layers also being connected together in Y relation, the two groups of circuit conductor paths comprising the secondary windings having inverted polarity patterns.

7. In an alternating-current electrical apparatus comprising concentrically arranged inductively related windings including a primary winding and a plurality of secondary windings, the secondary windings comprising a group of an even number of concentrically related single layer cylindrical coils of electrical conductors, each of the separate secondary windings including two coil layers of a different number of turns in series circuit relation, one of said secondary windings comprising the innermost and outermost coil layers of the group connected in series circuit relation, and another of said secondary windings comprising the next innermost and the next outermost coil layers of the group in series circuit relation, the number of winding turns in each of the two coil layers connected in series to form a secondary winding being different from the number of turns in the other one of the two coil layers connected in series, to provide a plurality of secondary windings having substantially the same reactance.

8. In an alternating-current electrical apparatus comprising concentrically arranged inductively related windings including a primary winding and a plurality of secondary windings, the secondary windings comprising a group of an even number of concentrically related single layer cylindrical coils of electrical conductor, the successive turns in each coil following a cylindrial helix path having the same diameter as the other turns in that coil, the separate secondary windings including two coils of a different number of turns in series circuit relation so arranged that the innermost and outermost coils of the group are connected in series circuit relation to form a winding, and the next innermost and the next outermost coil are connected in series circuit relation to form a winding, the number of winding turns in each of the two coil layers connected in series to form a secondary winding being different from the number of turns in the other one of the two coil layers connected in series, the number of turns in the innermost coil layer of the first above defined secondary winding being greater than the number of turns in the outermost coil layer, and the number of turns in the next outermost coil layer of the second above defined secondary winding being greater than the number of turns in the next innermost coil layer of the group to provide a plurality of secondary windings having substantially the same reactance.

9. In an alternating-current electrical apparatus comprising concentrically arranged inductively related windings including a primary winding and a pair of secondary windings, the secondary windings comprising a nested group of an even number of concentrically related single layer coils of electrical conductors, the successive turns in each coil layer having the same diameter as the other turns in that coil layer and following a cylindrical helix path, one of the secondary windings of said pair including the innermost and the outermost coil layers of the nested group of single layer coils connected in series circuit relation and the other one of the secondary windings of said pair including the next innermost and the next outermost coil layers of the nested group of layers connected in series circuit relation, the number of winding turns in each of the two coil layers connected in series to form a secondary winding being different from the number of turns in the other one of the two coil layers connected in series.

WILLIAM B. BIEBESHEIMER.

REFERENCES CITED

The following references are of record in the file of this patent:

UNITED STATES PATENTS

| Number | Name | Date |
|---|---|---|
| 2,374,029 | Maslin | Apr. 17, 1945 |